Jan. 9, 1962     O. F. POLLEYS ET AL     3,016,217
AERIAL DEVICE HAVING ROTOR FOR RETARDING DESCENT
Filed March 14, 1958     4 Sheets-Sheet 1

INVENTORS
OWEN F. POLLEYS
DONALD J. PAYTON
DONALD W. ROBINSON JR.

BY Teller & McCormick

ATTORNEYS

Jan. 9, 1962     O. F. POLLEYS ET AL     3,016,217
AERIAL DEVICE HAVING ROTOR FOR RETARDING DESCENT
Filed March 14, 1958     4 Sheets-Sheet 2
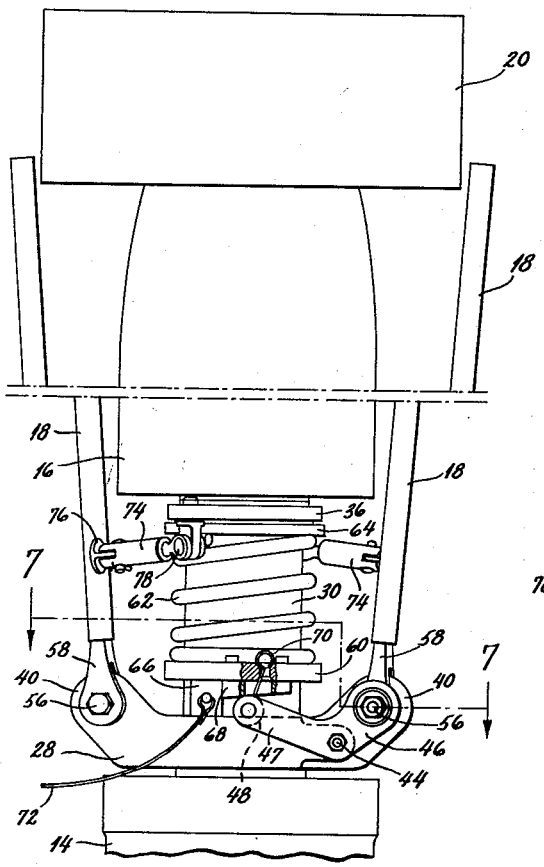
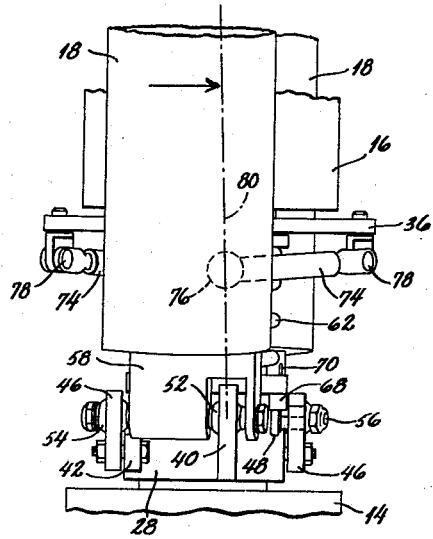
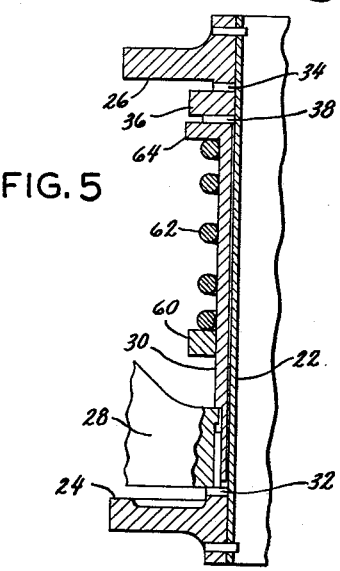
INVENTORS
OWEN F. POLLEYS
DONALD J. PAYTON
BY DONALD W. ROBINSON JR.
ATTORNEYS Jan. 9, 1962     O. F. POLLEYS ET AL     3,016,217
AERIAL DEVICE HAVING ROTOR FOR RETARDING DESCENT
Filed March 14, 1958     4 Sheets-Sheet 3

INVENTORS
OWEN F. POLLEYS
DONALD J. PAYTON
BY DONALD W. ROBINSON JR.

ATTORNEYS

Jan. 9, 1962     O. F. POLLEYS ET AL     3,016,217
AERIAL DEVICE HAVING ROTOR FOR RETARDING DESCENT
Filed March 14, 1958     4 Sheets-Sheet 4
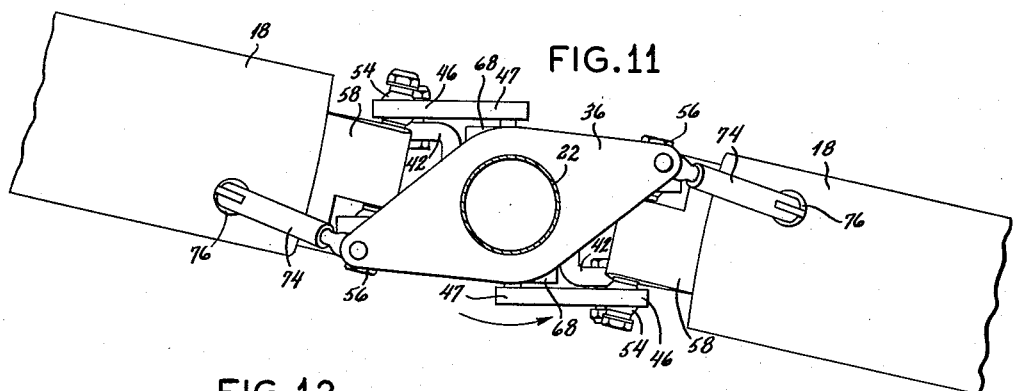
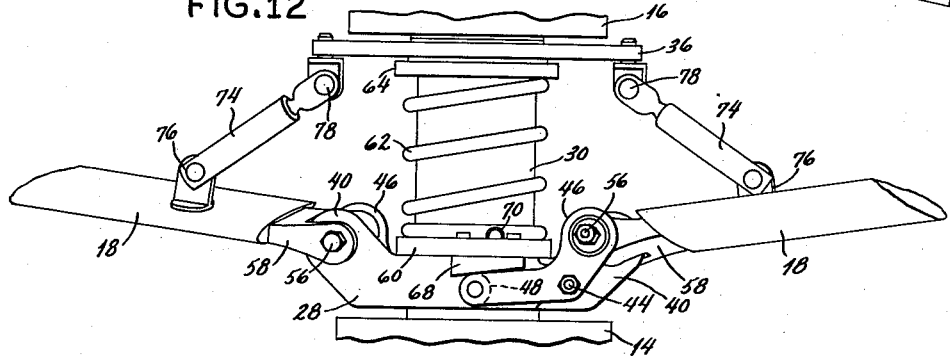
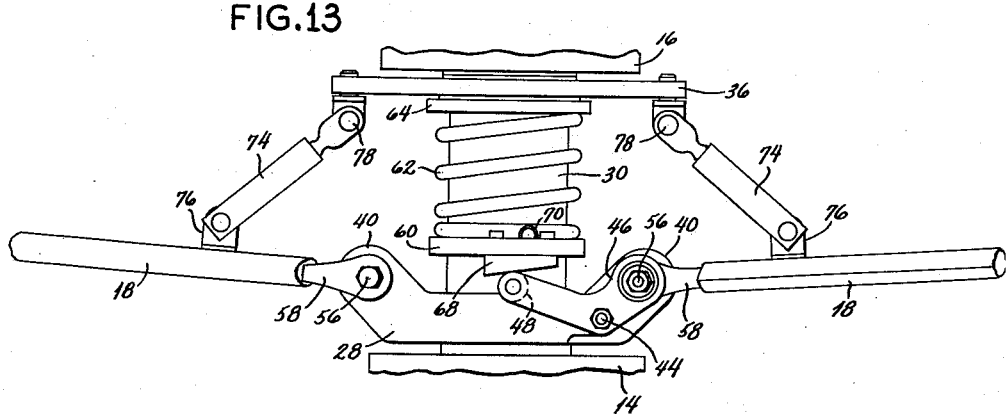
INVENTORS
OWEN F. POLLEYS
DONALD J. PAYTON
DONALD W. ROBINSON JR.
BY
*Teller & McCormick*
ATTORNEYS United States Patent Office 3,016,217
Patented Jan. 9, 1962

3,016,217
AERIAL DEVICE HAVING ROTOR FOR
RETARDING DESCENT
Owen F. Polleys, Windsor, Donald J. Payton, Hartford,
and Donald W. Robinson, Jr., Hazardville, Conn., assignors to The Kaman Aircraft Corporation, Bloomfield, Conn., a corporation of Connecticut
Filed Mar. 14, 1958, Ser. No. 721,605
11 Claims. (Cl. 244—138)

The invention relates to an aerial device having a rotor for retarding descent, said device being in many respects similar to that disclosed in the Wannland and Rhodes application Serial No. 504,166, filed April 27, 1955, and entitled "Aerial Device Having Rotor for Retarding Descent."

A device embodying the invention may be called a rotary blade parachute and it is adapted for the controlled safe delivery to the ground of supplies or equipment or an article or mechanism from an aircraft or otherwise from an elevated position. The device may be carried on an aircraft and released therefrom and said device may be connected to a container or body constituting or adapted to carry a useful load, but in these respects the invention is not necessarily limited. A device embodying the invention is adapted for use at various speeds including those in the supersonic range and it may be released at either a high altitude or a low altitude after which it descends in a stable attitude.

The general object of the invention is to provide an improved device of the type set forth in said prior application. A device embodying the invention is in some respects simpler than the prior device and is less costly, and it has various functional advantages.

The drawings show a preferred embodiment of the invention and such embodiment will be described, but it will be understood that various changes may be made from the constructions disclosed, and that the drawings and description are not to be construed as defining or limiting the scope of the invention, the claims forming a part of this specification being relied upon for that purpose.

Of the drawings:

FIG. 4 is an enlarged fragmentary view of the rotary blade device wtih its parts in the same relative positions as in FIG. 1, this view showing the device in vertical position instead of horizontal position for convenience of comparison with other views.

FIG. 5 is an enlarged view similar to a portion of FIG. 4 but showing some of the parts in section along a vertical plane through the axis.

FIG. 6 is a side view of the device with its parts in the same relative positions as in FIG. 4.

FIG. 7 is a horizontal sectional view taken along the line 7—7 of FIG. 4.

FIG. 11 is a plan view partly in section along the line 11—11 of FIG. 8 and in their initial extended positions as illustrated in FIG. 3, these being the positions to which the blades move from the intermediate positions shown in FIGS. 8, 9 and 10.

FIG. 12 is a view in some aspects similar to FIG. 8 but showing the blades in their said initial extended positions.

FIG. 13 is a view similar to FIG. 12 but showing the blades in positions to which they move as the result of increased speed.

*General description of device and manner of operation*

Figure 1:
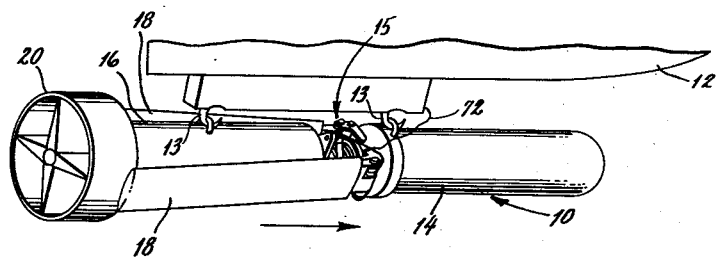
FIG. 1 is a partly schematic perspective view of a rotary blade device embodying the invention, together with a fragment of an aircraft for initially carrying said device.
Figure 3:
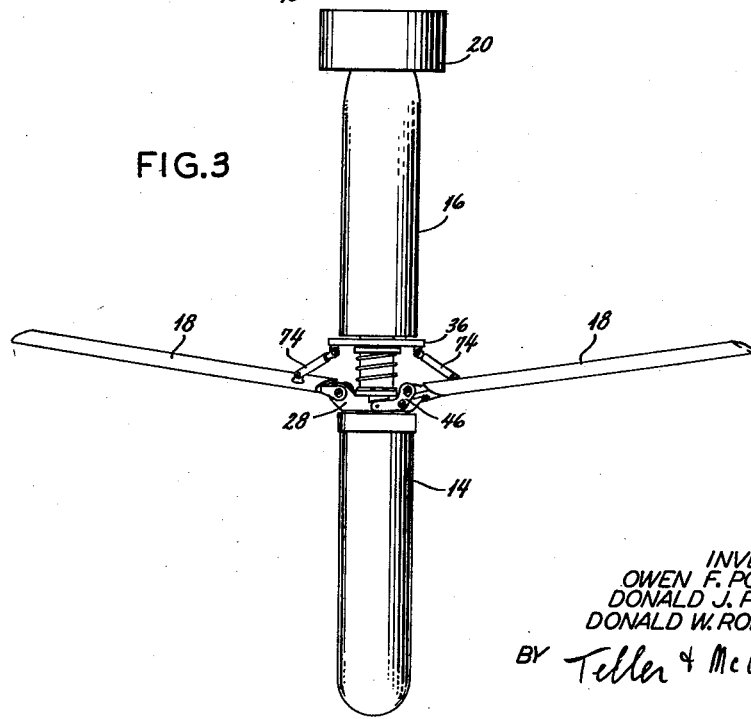
FIG. 3 is a side view of the rotary blade device during descent.

Referring to the drawings and more particularly to FIGS. 1 and 3, a rotary blade device embodying the invention is schematically shown at 10, and a portion of an aircraft transporting said device is schematically shown at 12. The device 10 is releasably supported on the aircraft 12 which constitutes a carrier, said device being so supported by releasable means 13, 13 and said device being ordinarily carried in an approximately horizontal position.

The device 10 is shown as comprising a body 14 which may be cylindrical and which may carry a load and it also comprises a rotor 15 which is connected with said body and serves as an aerodynamic retarding or braking mechanism. As shown, the rotor 15 is directly connected with the body 14 for rotation about an axis in fixed relation to said body, but the invention is not necessarily limited as to a fixed relationship between said axis and said body.

When the axis of rotation is in fixed relation to the body 10, there may be a second body 16 in longitudinal register with the first body. The second body 16 may also be cylindrical and may also carry a load. When there are two bodies, the body 14 is the forward or lower body and the body 16 is the rear or upper body. Preferably, the two bodies 14 and 16 are spaced apart and they are held in fixed relationship by a cylindrical connector which is preferably tubular. It will be understood that the described arrangement of two bodies with the braking device located between them is merely exemplary and that the invention is not so limited.

Figure 2:
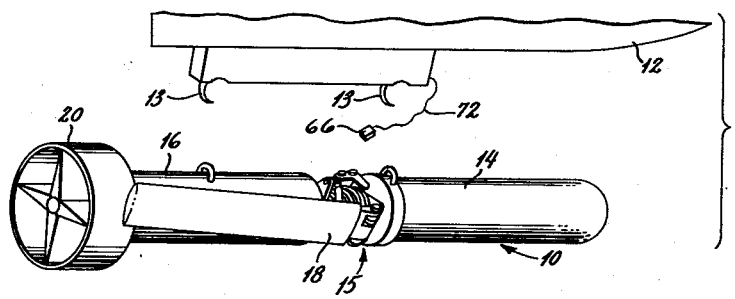
FIG. 2 is a view similar to FIG. 1 but showing the device immediately after release from the aircraft.

The rotor of the retarding or braking mechanism for the device includes a plurality of similar blades 18, 18 which are connected with a hub rotatable on the connector between the lower and upper bodies 14 and 16, said rotor being rotatable in a predetermined direction which may be the counterclockwise direction as viewed from the left in FIGS. 1 and 2 or as viewed from the top in FIG. 3. The blades are also movable relatively to the hub as hereinafter explained. As shown, the rotor comprises only two blades 18, 18, but three or more blades may be provided if desired. In any event, the blades are equally spaced circumaxially. Preferably, the rear or upper body 16 carries a cylindrical fin 20 which is concentric with the central axis of said body.

When the device 10 is released from the aircraft 12 and reaches a position such as that shown in FIG. 2, the forward motion of the device causes the blades 18, 18 to rotate in the said predetermined direction, for reasons to be fully explained. During rotation, the blades swing away from each other or outwardly, the swinging movement being caused at least partly by centrifugal force.

At the same time the device falls away from the aircraft 12 and as it continues to move, the fin 20 keeps the bodies 14 and 16 aligned axially with the air stream. The rotating blades 18, 18 retard or brake the forward movement of the device as hereinafter explained, and fins, not shown, additional to the fin 20 may be provided to prevent or at least minimize rotative movement of the bodies about their central axis. The said bodies have a stable trajectory from their initial point of release, and they soon reach a substantially upright position as shown in FIG. 3, said stable trajectory being due at least in part to the stabilizing effect of said fin 20. Once a steady state descent velocity has been reached, the device remains stable because of the peculiar attributes of the braking mechanism as hereinafter fully set forth.

More specific description of device

The construction and manner of operation of an aerial device embodying the invention have been very briefly outlined in connection with FIGS. 1 to 3. Reference will now be had more particularly to FIGS. 4 to 15 for a more detailed description of the mechanism of the device. For clarity, some of the parts will sometimes be referred to as horizontal and vertical, reference being had to the positions as shown in FIG. 3, rather than to the positions shown in FIGS. 1 and 2. It will be understood that such terms are used in a relative sense only and are not intended to limit the scope of the invention. For convenient comparison with FIGS. 10 to 15, and to avoid confusion of terminology, FIGS. 4 to 9 show the device in upright position notwithstanding the fact that in use the device may not reach upright position until after the blades have swung outwardly beyond the relative positions shown. As before stated, the rotor may have more than two blades, but for convenience of description, it will be assumed that there are only two blades and only two of the parts associated respectively with the blades.

In FIGS. 4 to 15, the before-mentioned connector between the bodies is a vertical tube or hollow cylinder identified as 22, said connector or cylinder being shown as a tube connected at its lower end to the upper wall 24 of the lower body 14 and connected at its upper end to the lower wall 26 of the upper body 16. The before-mentioned rotor hub is identified as 28, said hub being an annulus surrounding the cylinder 22 and rotatable relatively thereto. As shown, the hub 28 is keyed or otherwise secured to a rotatable sleeve 30 that surrounds the cylinder 22. An anti-friction bearing 32 is interposed between the lower end of the sleeve 30 and the body wall 24. An anti-friction thrust bearing 34 is interposed between the upper end of the sleeve 30 and the body wall 26. Preferably and for a purpose to be described, a ring 36 surrounds the cylinder 22 and engages the bearing 34 and a second anti-friction bearing 38 is interposed between said ring 36 and the top of the sleeve 30. It will be apparent that the ring 36 is freely rotatable relatively to the body 16 and relatively to the sleeve 30.

The two blades 18, 18 are similarly connected to the hub 28 for pivotal movements about transverse sweep axes which are defined by pins 56 and which are tangent to a cylinder concentric with the central axis. The connecting means for the blades are so constructed and arranged that the sweep axes may be tilted with respect to the hub. Said sweep axes may be tilted relatively to a horizontal plane for changing the pitches of the blades and for another purpose and they may also be tilted in parallelism with said plane for a purpose to be stated.

The presently preferred connecting means for one blade will be now described. Referring more particularly to FIG. 7, the hub 28 has two parallel integral supporting flanges 40 and 42 for each blade. Mounted on the flange 42 for movement about a horizontal axis at 44 is a lever 46 having an inwardly extending arm 47 carrying a roller 48. Secured in openings in the flange 40 and in the lever 46 are similar socket members 49 and 50 in which are fitted balls 52 and 54, said balls being apertured to receive and fit one of the before mentioned pivot pins 56. Each blade 18 at its inboard end has a blade support 58 which is apertured to receive and fit the corresponding pivot pin 56. As best shown in FIG. 6, the blade support 58 is preferably notched to receive the flange 40 and the corresponding socket member 48 and ball 54. The flanges 40 and 42 and other parts are preferably so located and arranged that the centerline of each blade is slightly spaced in the trailing direction from a plane through the central axis and perpendicular to the pivot pin 56. This will be readily apparent from FIG. 6.

The axis of each pin 56 constitutes the before-mentioned transverse sweep axes for the corresponding blade. The flange 40 and the lever 46 for each blade carry the corresponding pin 56 and constitute a pair of blade supports, the lever 46 being a movable support. Inasmuch as the rotor rotates counterclockwise, each ball 52 supports the corresponding blade near its leading edge and the relatively movable ball 54 supports the blade near its trailing edge. As hereinafter more fully explained, the movement of one of the balls for each blade relatively to the other ball for said blade will change the blade pitches. The ball 54 is carried by the movable lever 46 and it is therefore the ball 54 that is moved to change blade pitches.

A ring 60 is vertically movable along the sleeve 30, suitable means, not shown, being provided to prevent rotation of the ring relatively to the sleeve. A heavy coil spring 62 surrounds the sleeve 30 and abuts at its upper end against a collar 64 on said sleeve. The spring 62 abuts at its lower end against said ring 60 and biases the ring downwardly. Initially, a removable static block 66 is interposed between the ring 60 and the hub 28 and prevents downward movement of the ring beyond the position shown in FIGS. 4, 5 and 6.

The ring 60 carries a cam block 68 for each lever 46 and the roller 48 on the inner arm 47 of said lever abuts against the block. With the parts in the relative position shown in FIGS. 1 and 4 to 7, the axis of the pivot pin 56 is approximately horizontal and is approximately perpendicular to the flanges 40 and 42. When the several parts are in the last said positions, the centerlines of the blades 18, 18 extend generally rearwardly or upwardly from said pivot pins 56, 56, said blades having small coning angles and diverging slightly as shown. Said centerlines of the blades are at least approximately in axial planes passing through the axis of rotation. The last said positions are sometimes hereinafter referred to as "first positions." The blades in the said first positions have little or no pitch, as will be apparent from FIG. 7. Inward movement of the blades toward each other about their sweep axes at 56, 56 is limited by the cylindrical fin 20.

When the device is in use, centrifugal force acting on the blades serves as hereinafter explained to hold each roller 48 in engagement with its cam block 68. However, during shipment and handling, the lever may tend to separate from the block and to prevent this, a wire link 70 may be provided to hold the arm 47 of each lever 46.

Manner of operation

Automatically acting means are provided for tilting the sweep axes in one direction, that is, in the direction to tilt the blades 18, 18 forwardly from their said first positions to the positions shown in FIGS. 2 and 8 to 10, hereinafter referred to as the "second" positions. In the said second positions, the centerlines of the blades 18, 18 are inclined or tilted forwardly from the before-mentioned axial planes. The device, as shown in FIG. 2, is rapidly moving forwardly and when the blades have a coning angle as shown and described, said blades act aerodynamically irrespectively of any pitch angles, to start autorotation of the rotor in the counterclockwise direction. The said automatically acting means for tilting the sweep axes is shown as including the before-mentioned static block 66 and also a static cord 72 attached to said block 66 and to the aircraft 12. When the device 10 is released from the aircraft, the cord 72 withdraws the block 66 as shown in FIG. 2 from its initial position as shown in FIG. 4. The spring 62 and the ring 60 are also parts of said automatically acting means. Withdrawal of the block 66 permits said spring to move said ring from the FIG. 4 position to the FIG. 8 position. As the ring 60 moves to the last said position, the cam blocks 68 move the corresponding levers 46 so that the balls 54 are swung upwardly and also inwardly. The balls 52 on the fixed supports 40 are not bodily moved.

Figure 8:
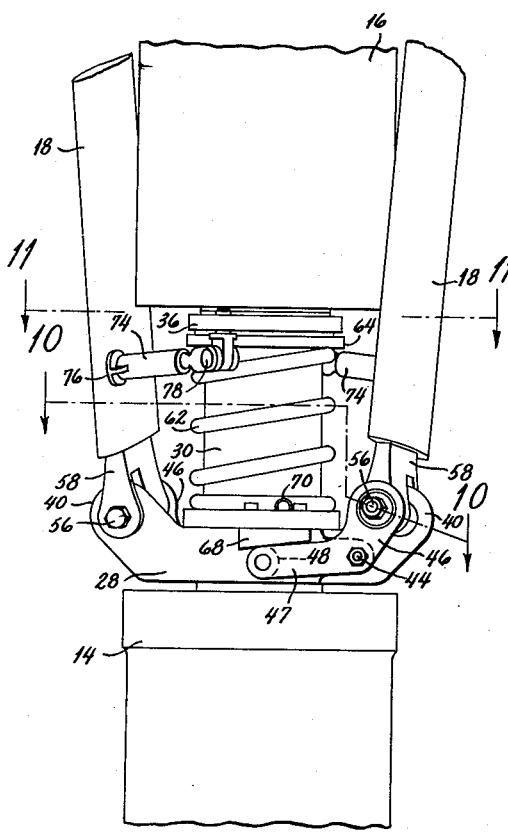
FIG. 8 is a fragmentary view similar to FIG. 4 but showing various parts in different relative positions hereinafter referred to as intermediate positions.
Figure 9:
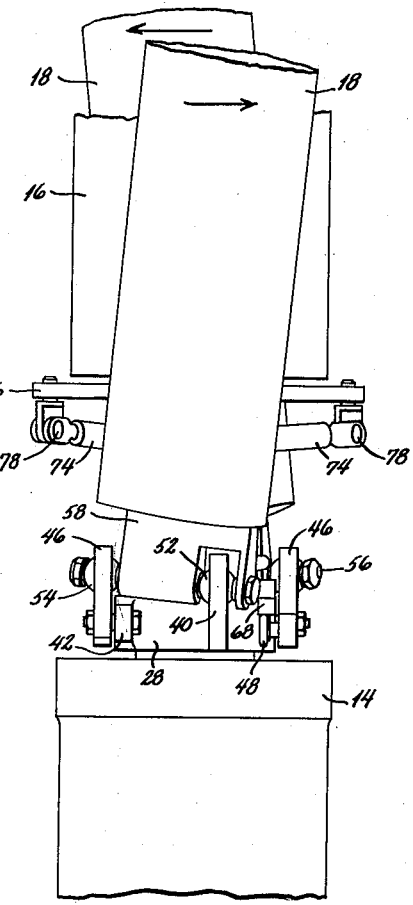
FIG. 9 is a side view with the parts in the same relative positions as in FIG. 8.

The upward components of the described bodily movements of the balls 54 serve to upwardly tilt the trailing ends of the sweep axes at 56 and to forwardly tilt the blades 18, 18 as before stated, the tilting of said axes and blades being clearly shown in FIG. 9. The inward components of the described bodily movements of the balls 54 on the movable levers or supports 46 serve to move the trailing edges of the blades 18, 18 relatively inwardly so as to provide said blades with negative pitches. The combined upward and inward movements of the balls 54 move the blades to their before-mentioned second positions as shown in FIGS. 2 and 8 to 10. Because of the very small coning angles of the blades in their second positions, the upward tilting of the sweep axes has but little effect on the pitch angles, but this tilting of the sweep axes affects the pitch angles to increasingly greater extents as the coning angles are increased. Assuming uniformity of coning angles, the two blades 18, 18 are always tilted to the same extents and they always have the same pitch angles, this being due to the fact that the positions of both balls 54, 54 are controlled by the same ring 60.

Figure 10:
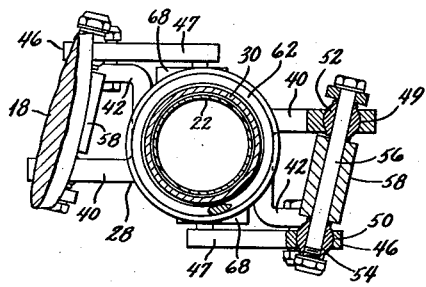
FIG. 10 is a horizontal sectional view taken along the line 10—10 of FIG. 8.

Autorotation of the rotor is started automatically, as before described, and the blades are swung outwardly by centrifugal force from their second positions as shown in FIGS 8 to 10 to positions approximating those shown in FIGS. 3 and 12, the last said positions being hereinafter referred to as the "third" positions. The described tilting of the sweep axes causes the blades to have relatively large negative pitch angles when they approach or reach the said third positions.

Referring particularly to FIG. 12, it will be seen that the arm 47 of each lever 46 has moved downwardly to the maximum extent and the corresponding ball 54 has been moved upwardly and inwardly to the maximum extent. As the result of the foregoing, the said negative pitch angles of the blades 18, 18 are at their maximum as indicated at the right in FIG. 12. Said large negative pitch angles tend to cause rotation of the rotor at a high speed. However, as the rotative speed approaches a predetermined optimum speed, the centrifugal forces acting on the blades 18, 18 tend to move the balls 54, 54 bodily outwardly. Outward movement of the balls turns the levers or supports 46, 46 so that said balls also move downwardly, the lever arms 47, 47 being moved upwardly in opposition to the spring 62. The downward components of the last said bodily movements of the balls 54 serve to move the trailing edges of the blades relatively downwardly with resulting decrease in the negative pitch angles. FIG. 13 shows the parts moved to positions wherein the blades have substantially no pitch or a small positive pitch. Pitch changes that decrease negative pitch angles or increase positive pitch angles will be referred to as effected "positively" or "in the positive direction." Pitch changes that decrease positive pitch angles or increase negative pitch angles will be referred to as effected "negatively" or "in the negative direction."

In operation, the parts are moved by centrifugal force from the position shown in FIG. 12 toward or to or beyond the positions shown in FIG. 13 until an equilibrium is established with the rotor rotating at the predetermined optimum speed. Any increase in rotative speed above said optimum speed will result in pitch angle changes in opposition to the spring 62 and in the positive direction which will decrease the speed, and any decrease in rotative speed below said optimum speed will result in pitch angle changes assisted by the spring 62 and in the negative direction which will increase the speed. In this way, there are only minor variations from the optimum speed.

It will be seen that the described balls 52, 54 and the parts directly associated therewith constitute means connecting the blades with the hub for pivotal movements about pitch axes extending generally longitudinally of said blades, said pivotal axes being near the leading edges of the blades and extending through said balls 52, 52. The spring 62 and the parts directly associated therewith constitute a single means directly connected with all of said blades 18, 18 and including a centrally located spring for biasing all of them in unison toward positions wherein their pitch angles are negative, as illustrated for instance in FIG. 12. The connection of said blades 18, 18 to said pivot pins 56, 56 and indirectly to said balls 52, 54 together with said spring means constitute means on said rotor automatically dependent upon the speed of autorotation for pivotally moving the blades in unison about their said pitch axes to maintain the before-mentioned optimum speed.

*Equalizing mechanism*

It is important that all of the blades of the rotor be always at equal coning angles, notwithstanding minor differences in shape or weight or in friction at the pivot pins or otherwise. To insure uniformity of coning angles, an equalizing mechanism is provided which includes the before-mentioned ring 36 which is rotatable about the central axis. Links 74, 74 respectively connect the blades 18, 18 with projecting ears on said ring 36. The links at their outer ends have universal connections 76, 76 with the blades and have universal connections 78, 78 at their inner end with the ears on the ring. As shown, the pivotal axis of the connection 76 of each link 74 with the corresponding blade 18 is approximately in a line 80 shown in FIG. 6, this line extending through the center of gravity, not shown, of the blade and the center of the ball joint at 52. Said ring 36 and said links 74, 74 serve to prevent either blade from moving to a coning position different from that of the other blade.

The invention claimed is:

1. An aerial device for retarding the descent of a body which device includes a rotor connectible with the body to be retarded and rotatable about a central normally vertical axis and in a predetermined direction which rotor includes a hub and also includes a plurality of generally radial blades equally spaced circumaxially, said rotor further including pivot means connecting the blades with the hub for pivotal movements about transverse sweep axes tangent to a cylinder concentric with said central axis which blades have equal pitch angles providing suitable angles of air attack for causing autorotation of said rotor in said direction as the device descends, and means on said rotor automatically dependent upon variations in the speed of autorotation for moving said pivot means so as to tilt said sweep axes with respect to said hub and relatively to a horizontal plane in one direction to positively change said pitch angles in accordance with increased rotative speeds and for moving said pivot means so as to tilt said sweep axes in the opposite direction to negatively change said pitch angles in accordance with decreased rotative speeds.

2. In an aerial device for retarding the descent of a body, the combination with said body of a rotor connected therewith and rotatable about a central normally vertical axis and in a predetermined direction which rotor includes a hub and also includes a plurality of generally radial blades equally spaced circumaxially, said rotor further including pivot means connecting the blades with the hub for pivotal movements about transverse sweep axes tangent to a cylinder concentric with said central axis which blades have equal pitch angles providing suitable angles of air attack for causing autorotation of said rotor in said direction as the device descends, and means on said rotor automatically dependent upon variations in the centrifugal action of said blades resulting from variations in the speed of autorotation for moving said pivot means so a to tilt said sweep axes with respect to said hub and relatively to a horizontal plane in one direction to positively change said pitch angles in accordance with increased rotative speeds and for moving said pivot means so as to tilt said sweep axes in the opposite direction to negatively change said pitch angles in accordance with decreased rotative speeds.

3. In an aerial device for retarding the descent of a body, the combination with said body of a rotor connected therewith and rotatable about a central normally vertical axis and in a predetermined direction which rotor includes a hub and also includes a plurality of generally radial blades equally spaced circumaxially, said rotor including pairs of transversely spaced blade supports on said hub for the respective blades one of which supports of each pair is relatively movable and said rotor also including pivot pins for said blades carried respectively by said pairs of supports and providing blade sweep axes tangent to a cylinder concentric with said central axis and said blades initially having equal pitch angles providing suitable angles of air attack for causing autorotation of said rotor in said direction as the device descends, and means on said rotor automatically dependent upon variations in the centrifugal action of said blades resulting from variations in the speed of autorotation for relatively moving said movable blade supports to tilt said pivot pins and said sweep axes with respect to said hub and relatively to a horizontal plane in one direction to positively change said pitch angles in accordance with increased rotative speeds and to tilt said pivot pins in said sweep axes in the opposite direction to negatively change said pitch angles in accordance with decreased rotative speeds.

4. An aerial device as set forth in claim 3, wherein the movable supports of said pairs are spaced in the trailing direction from the other supports of the pairs, and wherein said means automatically dependent upon centrifugal action is connected and ararnged to move said movable supports so as to relatively lower the trailing edges of the blades in accordance with increased rotative speeds and so as to relatively raise said trailing edges of the blades in accordance with decreased rotative speeds.

5. An aerial device as set forth in claim 3 wherein the movable supports of said pairs are spaced in the trailing direction from the other supports of the pairs, said movable supports being levers movable about transverse axes at a level below that of said pivot pins and spaced inwardly therefrom so that said levers and the corresponding ends of said pivot pins are movable either downwardly and outwardly or upwardly and inwardly, and wherein means is provided for biasing said levers in the directions for moving said levers upwardly and inwardly and for thereby raising the trailing edges of said blades to provide maximum negative pitch angles, said blades by centrifugal action transmitted through said pins serving to move said levers outwardly and downwardly in opposition to said biasing means to thereby lower said trailing edges of the blades and thus positively change the pitch angles of said blades.

6. An aerial device as set forth in claim 5 wherein said means for biasing said levers is a single spring connected to bias all of said levers simultaneously.

7. In an aerial device for retarding the descent of a body, the combination with said body of a rotor connected with the body and rotatable about a central normally vertical axis and in a predetermined direction which rotor includes a hub and a plurality of generally radial blades equally spaced circumaxially, said rotor further including pivot means connecting the blades with the hub for pivotal movements about transverse sweep axes tangent to a cylinder concentric with said central axis and said blades initially having first positions wherein they have a relatively small included coning angle and wherein their centerlines are at least approximately in axial planes passing through the axis of rotation, automatically acting means for tilting said sweep axes in one direction with respect to said hub and relatively to a horizontal plane to thereby move the blades from their said first positions to second positions wherein their centerlines are inclined forwardly from said axial planes so that they are acted upon by the air to start autorotation in the said predetermined direction with resultant sweeping movements of said blades to third positions wherein they have a relatively large included coning angle and wherein they have maximum negative pitch angles resulting from said tilted sweep axes, and means on said rotor automatically dependent upon increases in the speed of autorotation above a predetermined minimum speed for tilting said sweep axes in the direction opposite to that aforesaid and to thereby positively change the pitch angles of the blades.

8. An aerial device as set forth in claim 7 wherein said automatically acting means for tilting the sweep axes relatively to a horizontal plane also serves to tilt the last said axes in directions parallel with said horizontal plane to provide said blades with negative pitch angles.

9. In an aerial device for retarding the descent of a body, the combination with said body of a rotor connected with the body and rotatable about a central normally vertical axis and in a predetermined direction which rotor includes a hub and a plurality of generally radial blades equally spaced circumaxially, said rotor further including pivot means connecting the blades with the hub for pivotal movements about transverse sweep axes tangent to a cylinder concentric with said central axis, portions of the last said means being relatively movable to tilt said axis with respect to said hub and relatively to a horizontal plane and said blades initially having first positions wherein they have a relatively small included coning angle and wherein their centerlines are at least approximately in axial planes passing through the axis of rotation, an element engaging the hub and connectible with an aircraft for carrying the device and movable relatively to said hub when the device is released from the aircraft, means dependent upon the relative movement of said element for moving portions of said pivot means and for thereby tilting said sweep axes in one direction with respect to said hub and relatively to a horizontal plane to thereby move the blades from their said first positions to second positions wherein their centerlines are inclined forwardly from said axial planes so that said blades in said second positions are acted upon by the air to start autorotation in the said predetermined direction with resultant sweeping movements of said blades to third positions wherein they have a relatively large included coning angle and wherein they have maximum negative pitch angles resulting from said tilted sweep axes, and means on said rotor automatically dependent upon increased centrifugal action of said blades resulting from increases in the speed of autorotation above a predetermined minimum speed for moving said portions of said pivot means to tilt said pitch axes in the direction opposite to that aforesaid and to thereby positively change pitch angles.

10. An aerial device as set forth in claim 9 wherein the pivot means includes pairs of transversely spaced blade supports on said hub for the respective blades one of which supports of each pair is relatively fixed and the other of which supports of each pair is relatively movable, and wherein pivot pins for said blades are carried respectively by said pairs of supports which pins are tilted upon movement of said movable supports.

11. An aerial device as set forth in claim 10 wherein the movable supports of said pairs are levers movable about transverse axes at a level below that of said pivot pins and spaced inwardly therefrom so that said levers and the corresponding ends of said pivot pins are movable either upwardly and inwardly or downwardly and outwardly, and wherein said means dependent upon relative movement of said aircraft connectible element is a means for biasing said levers in the directions for moving said levers upwardly and inwardly and for thereby tilting the blades forwardly and for raising the trailing edges of said blades to provide maximum negative pitch angles, said blades by centrifugal action transmitted through said pins serving to move said levers outwardly and downwardly in opposition to said biasing means to positively change the pitch angles of said blades.

References Cited in the file of this patent

UNITED STATES PATENTS

| | | |
|---|---|---|
| 1,238,838 | Slate | Sept. 4, 1917 |
| 2,485,543 | Andreau | Oct. 25, 1949 |
| 2,526,451 | Benson | Oct. 17, 1950 |
| 2,545,736 | Isacco | Mar. 20, 1951 |